Aug. 20, 1963    W. P. BAERMANN    3,101,218
MULTIPLE SEATING
Filed Feb. 23, 1961    6 Sheets-Sheet 1

INVENTOR:
WALTER P. BAERMANN
BY
ATT'YS

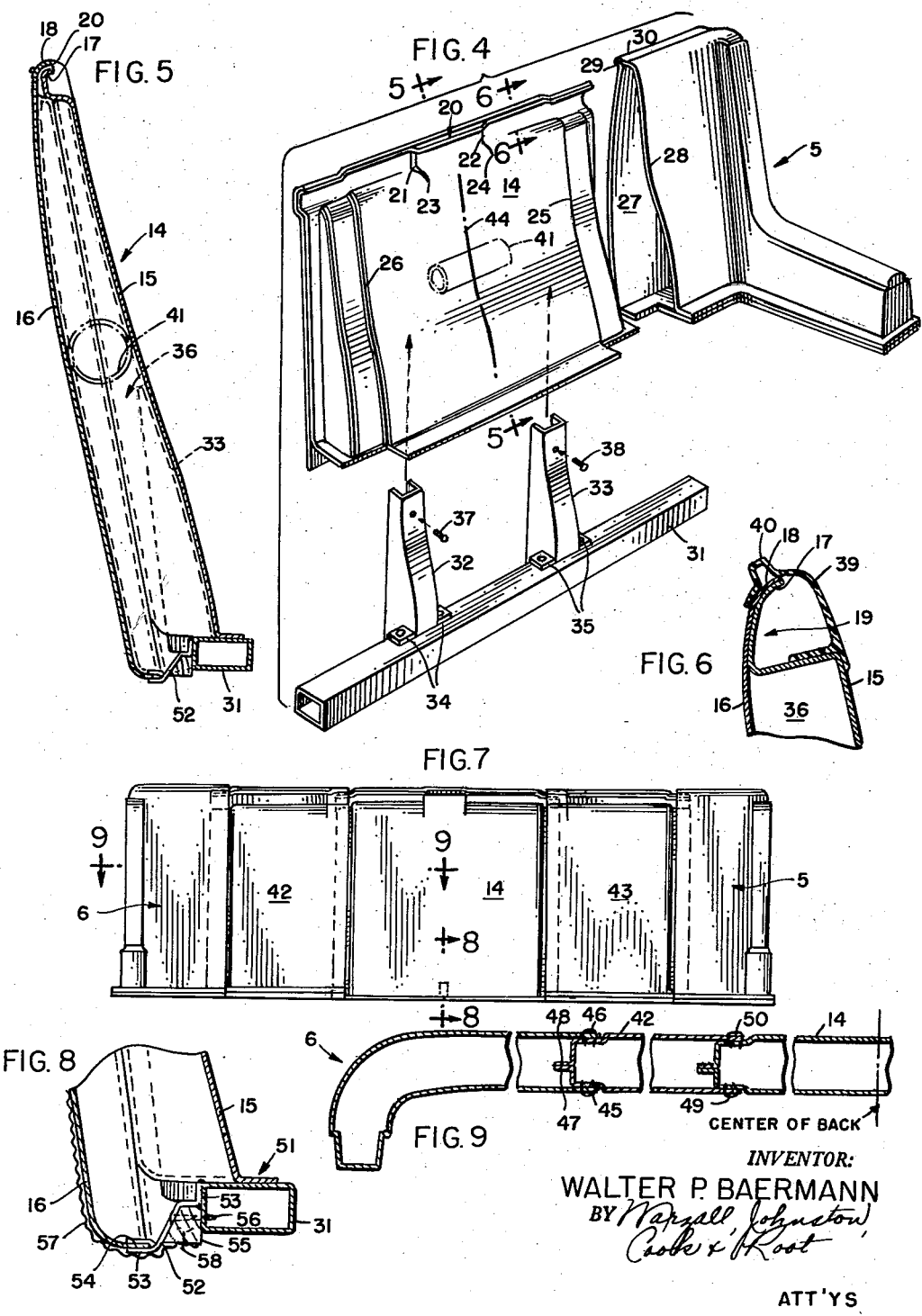

Aug. 20, 1963 W. P. BAERMANN 3,101,218
MULTIPLE SEATING
Filed Feb. 23, 1961 6 Sheets-Sheet 3
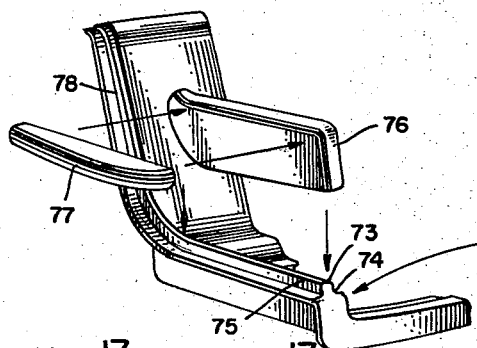
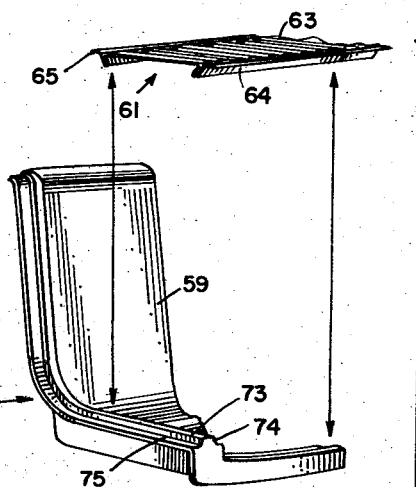
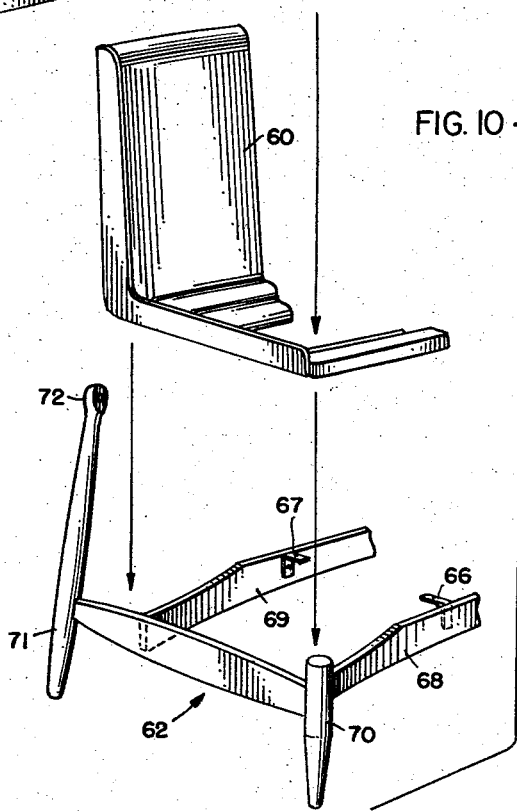
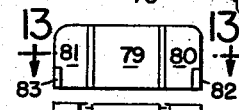
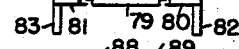
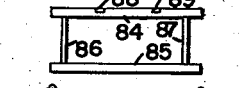
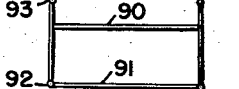
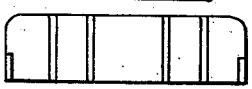
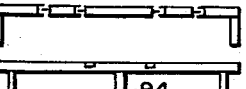
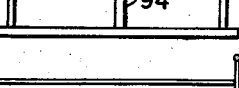
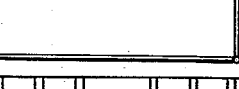
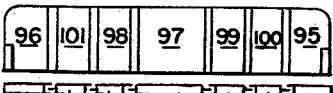
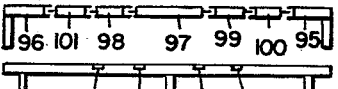
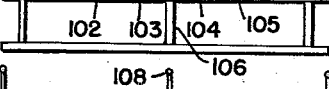
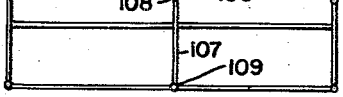
*INVENTOR:*
WALTER P. BAERMANN
BY *Marshall, Johnston,*
*Cook & Root*
ATT'YS

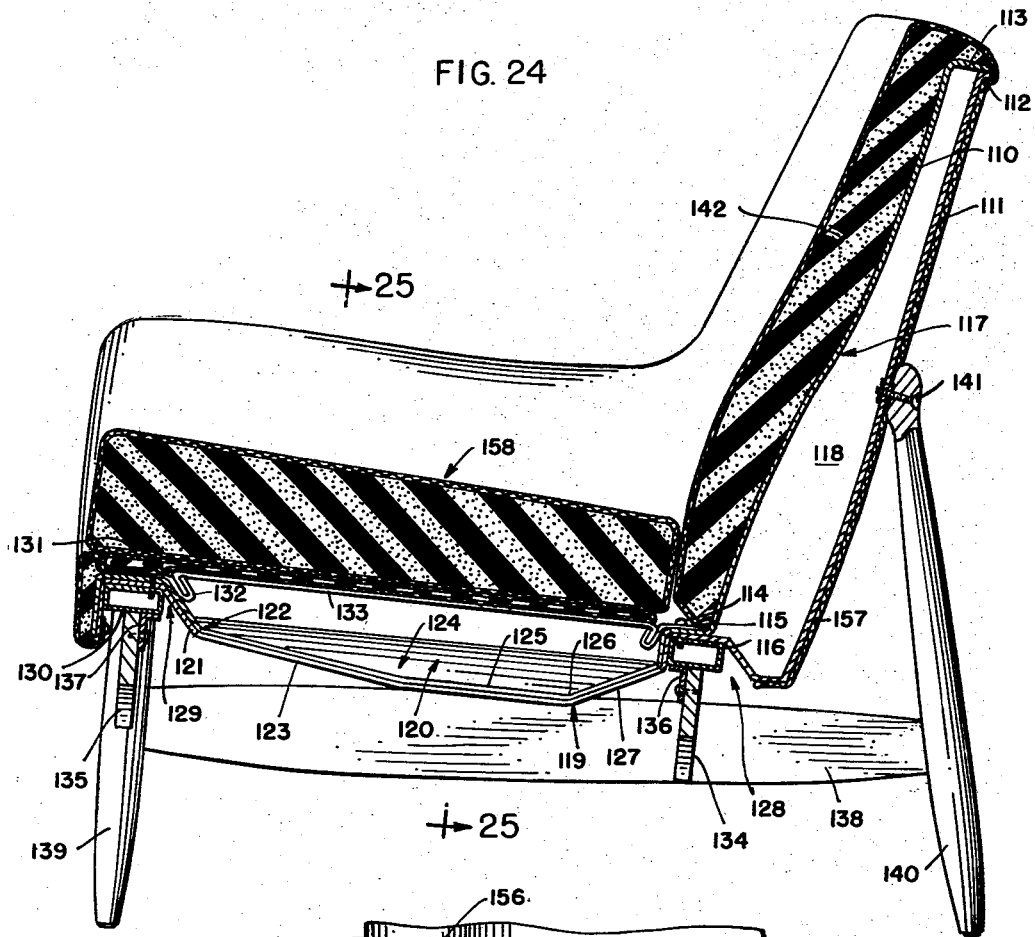
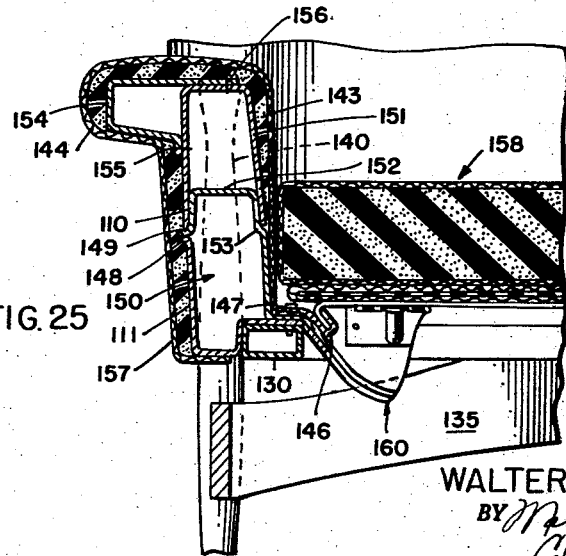

*INVENTOR:*
WALTER P. BAERMANN
BY
ATT'YS

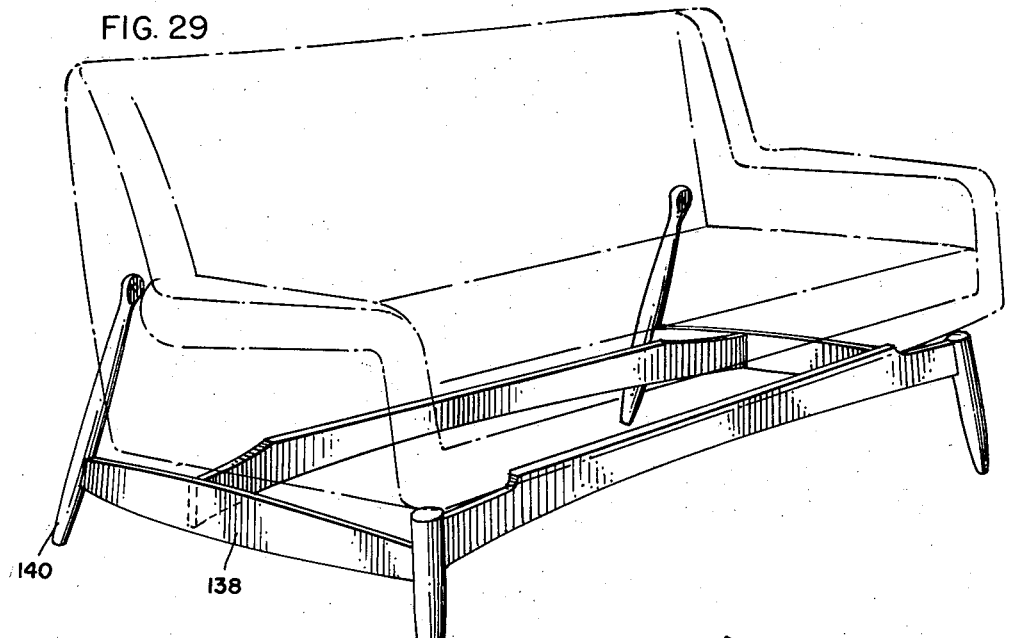
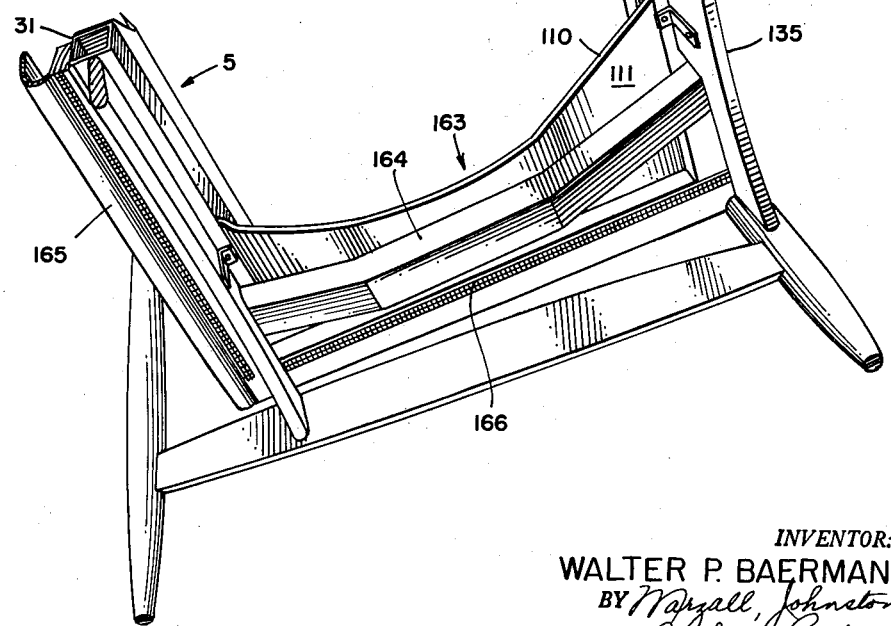

United States Patent Office 3,101,218
Patented Aug. 20, 1963

3,101,218
MULTIPLE SEATING
Walter P. Baermann, Waynesville, N.C., assignor to Prestige Furniture Corporation, Newton, N.C., a corporation
Filed Feb. 23, 1961, Ser. No. 91,017
15 Claims. (Cl. 297—455)

This invention relates to multiple seating and to a new and improved method for the manufacture thereof. The invention is especially concerned with upholstered multiple seating, including particularly sofas for seating two, three or four people for use in livingrooms, lounges and similar locations. The invention also contemplates multiple seating useful for various types of transportation vehicles, such as automobiles, airplanes and trains.

One of the objects of the invention is to provide multiple seating that is extremely light in weight.

Another object of the invention is to provide light weight upholstered multiple seating.

A further object of the invention is to provide a new and improved method of manufacturing multiple seating of the type described above which is relatively simple and less expensive than conventional methods that have been employed in the past.

Still a further object of the invention is to provide a new and improved method of manufacturing multiple seating of the type described which is readily adaptable to large scale manufacturing of seating for two or more people.

Another object of the invention is to provide a method of the type described which is characterized by the fact that production changes can be made in the type of multiple seating without a great deal of expense. For example, where a production line is set up to manufacture two-seat sofas it can readily be changed over to the manufacture of three-seat or four-seat sofas.

An additional object of the invention is to provide a new and improved method of the type described wherein a basic single seat article is used to provide the opposite sides of a multiple seated article.

Another object of the invention is to provide a new and improved type of multiple seating and a new and improved method of making multiple seating which eliminate many of the requirements and operations now employed in the present day manufacture of multiple seating.

A further object of the invention is to provide new and improved multiple seating characterized by the fact that seating having arms, armless seating and seating having arms with wings on the arms or back can be made readily from the same basic structure.

Another object of the invention is to provide a new and improved multiple seating structure manufactured from strong but light weight molded materials.

Other objects and advantages of the invention will appear from the following description in conjunction with the accompanying drawings in which:

FIGURE 4 is an exploded view showing the method of joining one of the end sections with a back insert and also showing the general relationship between the frame structure for the back of the article and the under structure to which legs can be attached, hereafter referred to as the "leg frame structure";

FIGURE 5 is a sectional view taken through the line 5—5 of FIGURE 4;

FIGURE 6 is an enlarged modified view of a section taken through the line 6—6 in FIGURE 5 illustrating a further step in the manufacture of the article;

FIGURE 7 is a front view illustrating the back and side frame structure of a three-seat sofa;

FIGURE 8 is an enlarged sectional view taken along the line 8—8 of FIGURE 7;

FIGURE 9 is an enlarged sectional view taken along the line 9—9 of FIGURE 7;

FIGURE 10 illustrates one embodiment of the relationship between the two shells which are laminated together to form the end structure, the springs, and the leg frame structure;

FIGURE 11 illustrates a modification of the structure shown in FIGURE 10 which is employed where it is desired to provide an arm on one or both ends of the article or to provide an arm containing a wing on one or both ends of the article;

FIGURES 12, 13, 14 and 15 illustrate diagrammatically the relationship between the components of the article for a two-seat article;

FIGURES 16, 17, 18 and 19 illustrate diagrammatically the relationship between the components of the article for a three-seat article;

FIGURES 20, 21, 22 and 23 illustrate diagrammatically the relationship between the components of the article for a four-seat article;

FIGURE 24 illustrates a section taken vertically adjacent one end of an article of seating made in accordance with a preferred embodiment of the invention, including cushioning and upholstering;

FIGURE 25 is a sectional view taken transversely along the lines 25—25 of FIGURE 24;

FIGURE 29 illustrates one form of leg frame structure for an article of the type described; and FIGURE 30 is a perspective view showing the under part of one end of an article of the type herein described.

Figure 1:
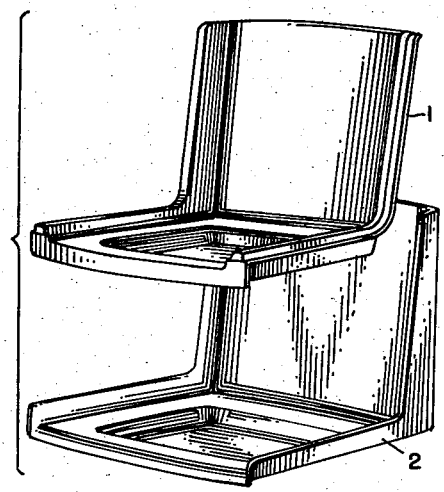
FIGURE 1 illustrates an exploded view of the basic back, seat and side frame of a chair in which the frame consists of an upper shell and a lower shell.

In accordance with the present invention multiple seating is manufactured by forming a pair of end sections each having a side and a back and connecting said end sections by at least one laterally extending insert. The resultant structure constitutes a frame to which cushioning can be applied at least to the interior and upholstering can be applied to the cushioning structure. In making a frame as described above it is preferable to first prepare a frame for a single seat chair and then sever it centrally and vertically to form the two end sections. Thereafter the backs of the end sections are connected by a telescoping insert which forms a relatively rigid structure across the back of the seating article. The forward parts of the end sections can also be connected by an inserted section. The invention is applicable to various types of frame structures but is especially useful where the end sections are molded and have hollow portions in the backs thereof adapted to receive the connecting back insert in a telescopic relation.

According to a preferred embodiment of the invention, the end sections are formed by first making a shell structure for a chair which consists of a front or upper shell and a back or lower shell. Each of these shells is a unitary molded structure which is preferably made by felting cellulose fibers from an aqueous slurry onto a porous former or die on which the fibers accumulate to the desired thickness. In practice, it is preferable to make each shell as a preform of molded fibers and each preform is dried to produce a final shell having a thickness from about ⅛ inch to 3/16 inch. The two shells are so shaped that they telescope into each other and have coinciding edges along the front, bottom, sides and back with an air space in the sides and back. Usually it is preferable to have a small flange along the sides and back where the shells coincide. The two shells are then bonded together at the points where they coincide and more particularly at the edges, either by means of adhesive or by stapling, to produce a unitary shell having a hollow back and sides.

Each of the component parts of the double shell is shaped in what might be described as a skin stress structure to provide maximum strength. The shape is also such as to permit mounting on a suitable frame to which the legs are attached in those cases where it is desired to produce furniture, such as livingroom furniture. The double shell structure affords excellent resiliency and unusual durability and at the same time it is relatively light in weight.

The double shell preformed molded structure made as described above is then severed vertically substantially along the center line, as previously indicated, in order to provide two end sections. Since the exposed parts of the backs of these end sections are hollow they are readily adapted to fit in telescopic relationship with one or more back inserts. The inserts are also preferably formed of a double shell made from preformed shells of molded fibers, each preformed shell being formed preferably by felting cellulose fibers from an aqueous slurry onto a porous former or die followed by drying to produce individual shells having a thickness from about ⅛ inch to 3/16 inch. These individual shells are then fastened together, either by stapling or by means of adhesive, to provide a back insert which is adapted to fit in telescopic relationship with one or both of the previously formed end sections. These back inserts are so shaped as to be hollow. They also have opposite sides of contoured reduced dimensions so that these sides can be inserted in the hollow openings of the backs of the end sections. At the juncture of the reduced side area and the larger area of the back insert an edge or shoulder is formed which acts as a stop when one side of the back insert is telescoped into the hollow portion of the back of an end section.

In constructing the back insert it is also desirable to shape the front or top shell so as to provide another edge, shoulder or recess several inches on each side of the center line near the top of the shell. This insert can then be severed to form two inserts which can be telescopically arranged with a back insert like the original insert to form a larger frame structure capable of accommodating three or more people.

Figure 2:
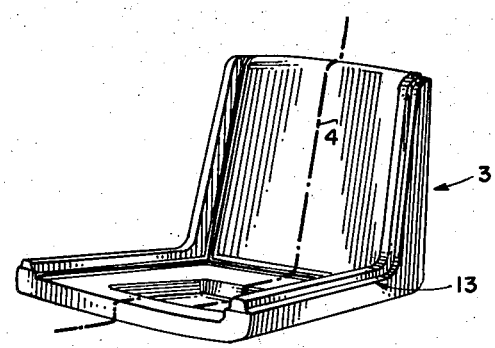
FIGURE 2 illustrates a front view of the two shells of FIGURE 1 laminated together to form a bottom, back and side frame structure in which the bottom portions of the two shells coincide and the sides and back are hollow.
Figure 3:
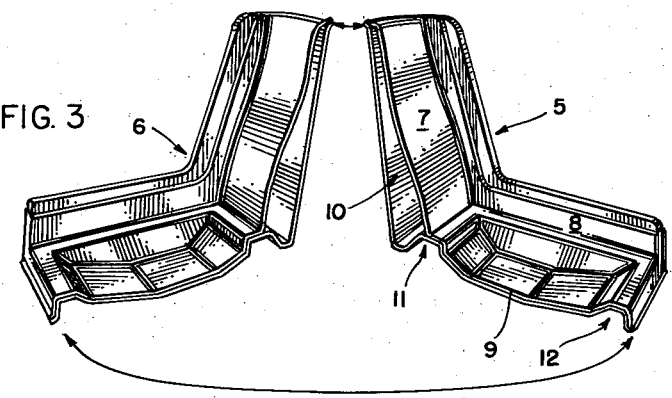
FIGURE 3 shows the laminated frame structure of FIGURE 2 after it has been severed vertically into two separate sections, hereinafter referred to as "end sections"

In FIGURE 1 of the drawings there is illustrated a front or upper shell 1 and a back or lower shell 2, both from felted cellulose fibers in the manner previously described, and adapted to fit together in complementary relationship to form a double shell structure 3 as illustrated in FIGURE 2. The double shell structure 3 is severed along the center line 4 to provide two end sections 5 and 6 as shown in FIGURE 3. It will be observed that each of the end sections 5 and 6 has a back portion 7 and a side portion 8 as well as a bottom portion 9. The end sections each have a hollow portion 10 in the back section. Each of the end sections also has a channel or recess 11 and 12 extending along the back and front of the structure, respectively, and adapted to accommodate a frame or under structure to which legs can be attached. A similar channel or recess extends beneath the side portion 8 and the corresponding portion of the end section 6. The upper and lower shells 1 and 2 coincide in the bottom area 9 to form a strong laminated structure. They also coincide and are fastened together at the flanges 13.

Referring to FIGURE 4 of the drawings the end section 5 is adapted to fit telescopically with a back section 14 sometimes referred to herein as a back insert.

As shown in FIGURE 5 the back section 14 is formed from an upper or front shell 15 and a lower or back shell 16. These shells are both preferably formed from felted cellulose fibers as previously described. It will be noted that the front shell 15 curves outwardly at the bottom and inwardly near the middle and toward the top. In other words, it changes from a convex to a concave curvature. The back shell 16, on the other hand, preferably has a relatively uniform convex curvature. An important feature of the invention resides in the fact that the upper parts of the shells 15 and 16 are curved at 17 and 18, respectively, as shown in FIGURE 6 and the shell 15 is so shaped as to form a re-entrant portion 19. The portions 17 and 18 coincide and are fastened together either by stapling or by adhesive except in the central area where they are spaced apart by a space 20. The space 20 is closed on opposite ends at 21 and 22 by the contour of the molded shell which also serves to form shoulders 23 and 24. The front molded shell 15 is also contoured to form shoulders 25 and 26. Thus, when the back section 14 is inserted into the space 27 of the end section 5 the shoulder 25 abuts against the edge 28 of the end section 5. It will be noted that the end section 5 has coinciding upper flanges 29 and 30 which are secured together by adhesive, stapling or in any other suitable manner, and which provide an exceptionally rigid and strong laminated structure in which the lamination extends in the opposite direction from the laminations 17 and 18 of the back insert 14. In this way, the assembled structure is adapted to provide maximum strength against forces exerted in any direction.

In the manufacture of sofas and the like it is desirable to provide an under structure or leg frame consisting of a hollow metal piece 31 and having two or more metal braces 32 and 33 welded or otherwise fastened thereto at 34 and 35. These braces each preferably curve in the manner shown so that they will fit into the hollow portion 36 of the back section 14. The braces 32 and 33 can also be fastened by means of staples 37 and 38 or other fastening elements to the back section 14.

In the modification shown in FIGURE 6 a piece of relatively rigid plastic material 39 is secured over the recess 19 so that this recess is not detectable in the handling and use of the resultant article. A ridge 40 is also provided in the molded plastic material 39 which is a continuation of the flange formed by the laminated portions 29 and 30 of the end section 5 and of the opposite end section. The provision of the molded plastic insert 39 is optional and, if desired, other means can be employed to accomplish a similar purpose.

Since the back section 14 is hollow it is sometimes desirable to reduce the acoustical effect by inserting a tube 41 therein. This tube can be made of fiber or a molded plastic material and its use is optional.

In the assembly shown in FIGURE 4 the addition of the end section 5 to the back section 14 and the addition of another end section 6 on the side of back section 14 opposite end section 5 provides a side and back frame for a two-seat sofa.

In the embodiment shown in FIGURE 7 a side and back frame is provided for a three-seat sofa. This consists of two end sections 5 and 6 and a central section 14 as previously described telescopically arranged with two additional back sections 42 and 43. The additional back sections 42 and 43 are formed by severing or cutting the back section 14 of FIGURE 4 along the center line 44.

FIGURE 9 illustrates a plan cross section taken through the line 9—9 of FIGURE 7 with parts broken away. It will be seen that the end section 6 telescopes into the intermediate section 42 and the two sections are fastened together by means of staples 45 and 46 or by means of adhesive or in any other suitable manner. It will also be noted that the intermediate section 42 consists of two shells which have flanges 47 and 48 that are stapled or otherwise fastened together. The intermediate section 42 fits in telescopic relationship with the central section 14 and is secured by means of staples 49 and 50 or by adhesive or in any other suitable manner. A similar arrangement exists on the opposite side of the back structure.

FIGURE 8 is an enlargement of the lower portion of the section shown in FIGURE 5 taken along the line 8—8 of FIGURE 7. The upper or front shell 15 of the back section is fastened preferably by means of screws or rivets, not shown, to the metal frame 31 at the point 51. A metal clip 52 is welded at 53 to the metal frame 31. The metal clip 52 is provided at its lower end with a forked structure consisting of two flat metal strips 53 and 54 adapted to grip and hold the lower end of the back shell 16. A piece of wood 55, or other suitable material, is positioned between the clip 52 and the back end of the frame member 31 and fastened to the latter in any suitable manner, for example, by means of a screw 56. This provides a surface to which a cloth material 57, or other type of fabric, can be fastened at the point 58.

FIGURE 10 illustrates the manner in which the shells 59 and 60, springs 61 and a leg frame 62 are assembled. As previously indicated, the shells 59 and 60 are telescoped together to form a double shell. The springs 61 in the embodiment shown consist of a plurality of strips of rubber webbing 63 fastened on opposite sides to angular metal plates 64 and 65. The plates 64 and 65 are fastened adjacent one end to the bottom part of the end section formed from the shells 59 and 60. This end section is also fastened by means of screws, or other suitable means, through brackets 66 and 67 to the cross frame members 68 and 69. The latter in turn are connected to legs 70 and 71. The leg 71 extends upwardly and the upper part 72 is fastened by means of screws or bolts to the back of the double shell formed from the elements 59 and 60.

In the embodiment previously described the back and side frame is intended for use on seating without arms. However, it is so constructed that the end sections, and more particularly, the upper part of shell 59 adjacent its outer edge have an upwardly extending portion 73 on the opposite sides of which there is molded a groove or recess 74 and 75.

As shown in FIGURE 11 a hollow molded arm piece 76 which is preferably also made of felted fibers having a thickness from about 1/8 inch to 3/16 inch is so shaped that it fits in telescopic arrangement with the upwardly extending piece 73 and when the two pieces are assembled an arm structure is provided.

Where a wing is desired on the arm another hollow piece is molded as shown at 77 and is stapled or otherwise secured to the upper part of the arm piece 76. Similarly, molded arms and molded arms containing wings can be applied in telescopic arrangement to the portion 78 of the back structure.

FIGURES 12 to 23 are diagrammatic views illustrating the assembly of the component parts for multiple seating adapted to accommodate two, three or four persons.

In FIGURES 12 to 15 the embodiment shown is adapted to accommodate two persons. FIGURE 12 shows a back section 79 corresponding to the back section 14 of FIGURE 4 and end sections 80 and 81 corresponding to end sections 5 and 6 previously described. The numerals 82 and 83 represent the sides of the end sections 80 and 81, respectively.

FIGURE 13 is a diagrammatic plan section taken along the line 12, 12 of FIGURE 12 illustrating the manner in which the three component pieces are assembled.

FIGURE 14 illustrates a metal frame on which the back and end sections rest, the member 84 corresponding to the frame member 31 of FIGURE 4. The front and side frame members which lie in the same plane are 85, 86 and 87. The braces 88 and 89 correspond to the braces 32 and 33 in FIGURE 4.

FIGURE 15 is a plan view of the under carriage and leg structure herein called the "leg frame," in which, for example, the cross piece 90 would correspond to the cross piece 69 in FIGURE 10, the cross piece 91 would correspond to the cross piece 68 in FIGURE 10, the leg 92 would correspond to the leg 70 in FIGURE 10 and the leg 93 would correspond to the leg 71 in FIGURE 10.

FIGURE 16 illustrates diagrammatically an elevational view of the back structure for a three-seat sofa shown in FIGURE 7 and FIGURE 17, like FIGURE 13, is a diagrammatic sectional view showing the manner in which the components of the back are arranged in telescopic arrangement.

FIGURE 18 is a plan view of the metal frame for the structure shown in FIGURES 16 and 17 and contains an additional cross piece 94.

FIGURE 19, like FIGURE 15, shows a leg frame similar to that illustrated in the lower part of FIGURE 10.

In general, FIGURES 16 to 19 correspond to FIGURES 12 to 15, respectively, except that they contain two additional half back sections and the additional cross member 94.

FIGURE 20 illustrates diagrammatically an elevation of the back and end sections of a four-seat sofa in which in addition to the end sections 95 and 96 corresponding to end sections 5 and 6 and the central section 97 corresponding to the central section 14 of FIGURE 4, there are four inserts or half back sections 98, 99, 100, and 101.

FIGURE 21 is a diagrammatic sectional view of FIGURE 20 illustrating the manner in which the components of the back structure are arranged telescopically.

FIGURE 22 illustrates the metal frame to support the structure shown in FIGURES 20 and 21 and in this case there are four supporting braces 102, 103, 104 and 105, generally similar in structure to the braces 32 and 33 of FIGURE 4. The metal frame also has an additional cross member 106.

FIGURE 23 is a plan view of the leg frame which is similar to the leg frames in FIGURES 15 and 19, except that it contains an additional cross member 107 and two additional legs 108 and 109.

FIGURE 24 is an enlarged vertical sectional view taken through the end piece 6 and illustrating in detail one form of upholstered article provided in accordance with the invention.

As shown in FIGURE 24, the end section consists of an upper shell 110 and a lower shell 111, both formed from a molded fibrous material. The shell 111 has a flange at 112 which is secured to a flange 113 of the shell 110 by stapling or by means of adhesive, or in any other suitable manner. The two shells are also secured together by means of a series of screws 114 which extend through a metal fastening device 115 and also through a metal frame member 116. The shell 110 is curved in the manner shown at 117 and the two shells together enclose a space 118. The two shells coincide in the bottom area as indicated by 119. This produces an unusually strong structure and also forms a well or recess area 120 which is preferably deeper toward the back of the article. This is made possible by providing a rather sharply inclined area 121 which forms an obtuse angle 122 with a less sharply inclined area 123 extending approximately to the center of the article as measured from front to back where there is a greater obtuse angle 124 with respect to a less sharply inclined area 125. The latter forms another obtuse angle 126 with an upwardly inclined area 127. It will be observed that the double shells 110 and 111 are contoured to form spaces or channels 128 and 129 into which the metal frames 116 and 130 fit. The metal frame 130 is secured by means of screws 131 to the front part of the laminated shell. The screws 131 also pass through and secure to the shell a member 132 which is similar to the member 115 and is a fastening device for an elastic web 133. There are a plurality of elastic webs 133 extending from one side of the article to the other and running from front to back which act as springs. Other suitable type of springs or resilient means can be employed. The metal frame members 116 and 130 are secured respectively to transverse leg frame members 134 and 135 by means of brackets 136 and 137 which are welded to the metal frame members and fastened by means of screws or other suitable means to the transverse members 134 and 137. The transverse members 134 and 137 in turn are fastened to a leg frame member 138 running from the front to the back of the article. The latter is also connected to legs 139 and 140. The front transverse member 135 is likewise connected to leg 139. The rear leg 140 is also secured by means of a bolt 141 to the rear or lower shell member 111. Molded cushioning 142 is applied by means of adhesive or in any other suitable manner to the front side of 110. This cushioning may be formed of polyurethane foam or any other type of resilient cushioning material. Similar cushioning is applied to the inside and top of the arm at 143 as shown in FIGURE 25 and, if desired, can be applied to the outside of the arm and the outside of the chair as shown at 144. In addition to springs running from front to back it is usually desirable to provide at least one strip of elastic webbing 145 which runs from one side of the article to the other and is held in place at opposite ends by a fastening device 146 which is fastened to the metal frame 130 by means of a screw or other suitable fastening means 147. A similar arrangement is provided in the opposing end section.

From FIGURE 25 it will be seen that the lower shell 111 is provided with a flange 148 and the upper shell 110 is provided with a flange 149. The flanges coincide at the side of the article and are fastened together either by stapling, by adhesive, or in any other suitable manner. The shape of the shells 110 and 111 at the side of the article is such as to provide a space 150.

Where it is desired to provide an arm on one or both sides of the article an auxiliary piece 151 is molded, preferably from a felted fibrous material, with a cross sectional shape similar to that shown in FIGURE 25 and is adapted to telescope over the top 152 of the side of the end section. A recessed area 153 is provided which acts as a stop or seat for the telescoping piece 151.

Where it is desired to make an article having a wing on the arm, another piece 154 is molded which has a flange 155 that is stapled or otherwise secured to the side of the piece 151. The top of the wing piece 154 is also stapled or secured by means of adhesive at 156 to the top of the arm piece 151. The entire article is upholstered by a suitable fabric 157 and a suitable cushion 158 is provided. In between the cushion and the springs it is also preferable to provide a padded fabric 159.

According to one embodiment of the invention the laminated bottom structure of the double shell is cut away at 160 as shown in FIGURE 25.

Figure 26:
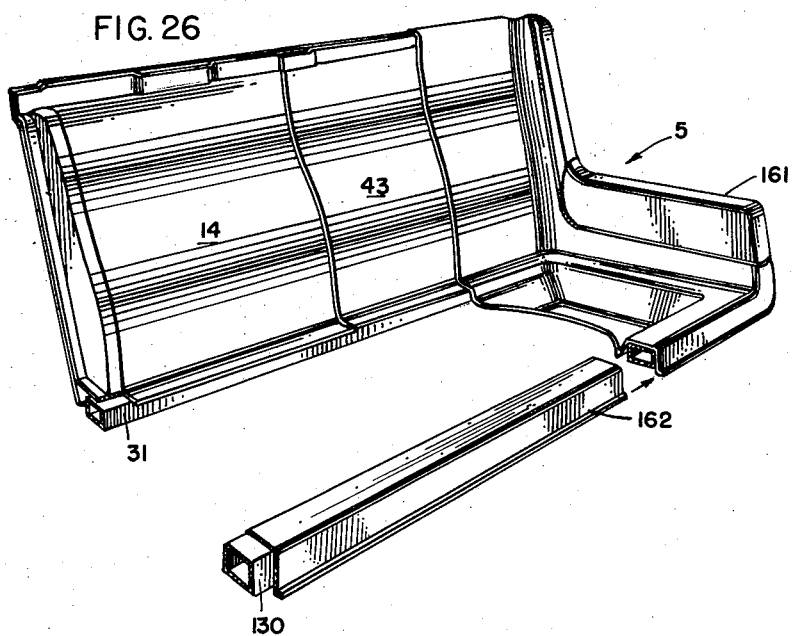
FIGURES 26, 27 and 28 illustrate the manner in which various portions of the bottom, back and side frames are telescoped together.

FIGURE 26 is a perspective view illustrating the end section 5 after a molded arm piece 161 has been applied thereto. In this view there is also shown an auxiliary molded piece 162 which is preferably formed of the same material as the double shells and which generally conforms in shape to the top and front part of the end section 5. This piece is fastened to the frame member 130 and extends across the front of the article.

Figure 27:
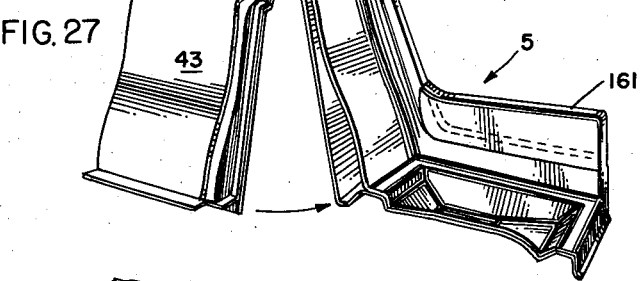

FIGURE 27 illustrates the manner in which the end section 5 telescopes into the half back section 43.

Figure 28:
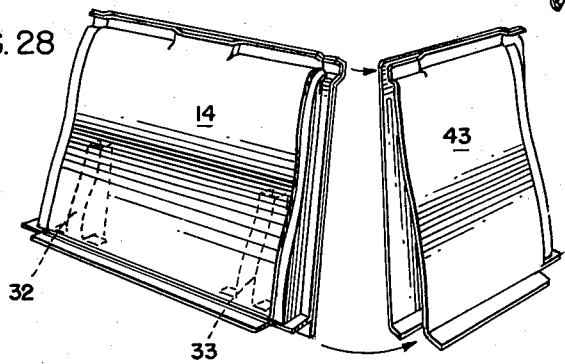

FIGURE 28 illustrates the way in which the half back section 43 telescopes into the back section 14 and also shows the general position of the braces 32 and 33.

FIGURE 29 is a perspective view showing one type of leg frame structure for a two-seat upholstered sofa.

FIGURE 30 is an underneath plan view of one end of the sofa shown in FIGURES 24, 25 and 29 showing a cut away portion 163 in the bottom of the laminated shell. In this embodiment a metal brace 164 is welded or otherwise fastened to the metal frame members 31 and 130 and the upper part of this metal brace is in contact with the lower part of the bottom of shell 111. The upholstery material is secured to the bottom of the double wall shells by staples or other suitable means along the lines 165, 166 and 167.

The thickness of the pre-molded foam cushioning may vary substantially, for example, from ¾ inch on the arms to 2½ to 3 inches on the backs.

While the multiple shell structure is preferably made from cellulose, other materials which are moldable to self-sustaining structures may be used including, for example, thermoplastic sheet materials, mixtures of cellulose fibers and cut bundles of glass filaments (cut rovings), mixtures of cellulose fibers and synthetic fibers (e.g., polyamides such as nylon, polyesters such as Dacron), mixtures containing rubber, mixtures containing synthetic rubber, and the like. The various mixtures may also contain binders or reinforcing substances. Thus, mixtures of cellulose fibers and cut glass rovings (⅛ inch to 6 inches in length) containing 5% to 95% cellulose based on the weight of the total fibers and 5% to 25% by weight of a polyester resin afford excellent shell structures for the purpose of the invention. Similarly, asbestos and other fibers can be used.

As will be seen from the foregoing description the present invention makes it possible to manufacture seating which is extremely light in weight due to the fact that the basic end structures and back sections are composed primarily of light weight molded materials. The invention also provides a new and improved method of manufacturing multiple seating which is relatively simple and less expensive than conventional methods that have been employed in the past. It is also possible in the practice of the invention to minimize production expense because of the comparative ease with which a production line which is set up to manufacture single seating can be converted to the manufacture of multiple seating including, for example, two-seat, three-seat and four-seat sofas.

I claim:

1. The method of making multiple seating which comprises forming a single seat structure having opposite sides and a back with a hollow space in said back, cutting said structure vertically at a point located substantially equidistant from the sides to form two end sections each having a side and a back and having opposing openings in said back and connecting said sections together at said openings by a back section.

2. The method of making multiple seating which comprises forming a single seat structure having opposite sides and a back with a hollow space in said back, cutting said structure vertically at a point located substantially equidistant from the sides to form two end sections each having a side and a back and having opposing openings in said back and connecting said sections together at said openings by a plurality of telescopically arranged back sections.

3. The method of making multiple seating which comprises forming a single seat structure having opposite sides and a back, said structure comprising an upper shell and a lower shell which are spaced apart in the back of said structure, cutting said structure vertically at a point located substantially equidistant from the sides to form two end sections each having a side and a back and having opposed openings in the back, forming a back section having a front and back shell which are shaped to fit into the openings in the backs of said end sections and assembling the resultant structure with the opposing sides of said back section inserted into the openings in the backs of said end sections.

4. The method of making multiple seating which comprises forming a single seat structure having opposite sides and a back, said structure comprising an upper shell and a lower shell which are spaced apart in the back of said structure, cutting said structure vertically at a point located substantially equidistant from the sides to form two end sections each having a side and a back and having opposed openings in the back, forming a full back section having a front and back shell which are shaped on opposing ends to fit into the openings in the backs of said end sections, with portions abutting against the cut edges of said end sections, said front shell of said full back section having shoulders extending outwardly on opposite sides of a vertical center line, severing a second full back section substantially at said center line to form two half back sections and assembling the resultant structure with the opposing sides of said full back section inserted in one end of each of said half back sections and the other end of each half back section inserted into the openings in the backs of the respective end sections.

5. Multiple seating comprising a seating structure having a pair of end sections each having a side and a back in the form of a pair of molded front and rear shells coinciding with one another at the edges and spaced apart in opposing back portions and a molded back section having its opposite ends telescopically arranged with respect to the backs of said end sections, said molded back portions and said molded back section engaging one another to form telescopic joints.

6. Multiple seating comprising a seating structure having a pair of end sections each having a side and a back formed from a pair of molded shells coinciding with one another at the edges and spaced apart to provide openings in opposing back portions, a molded back section consisting of a front shell and a back shell secured together at the upper edges and spaced from each other, said front shell being shaped to permit the opposite ends of said back section to be inserted into the spaces in the backs of said end sections, said front shell also being shaped to provide shoulders spaced inwardly from opposite ends of said back section and adapted to abut edges of said end sections when said back section is inserted into said end sections, and means to secure said back section and said end sections together in telescopic relationship.

7. Multiple seating as claimed in claim 6 in which there are a plurality of telescoping back sections.

8. Multiple seating as claimed in claim 6 comprising a plurality of back sections in which some of the back sections are different widths from others.

9. Multiple seating comprising a seating structure having a pair of end sections each having a side and a back formed from a pair of molded shells each having a flanged edge running along the side and at the top, said flanged edges extending outwardly and the flanged edge at the top extending rearwardly, said flanged edges being fastened together, and a molded back section consisting of a front shell and a back shell shaped at opposite ends to engage telescopically with the backs of said end sections, the upper part of said front and back shell of said back section being laminated together and curved forwardly in such a manner as to provide a reentrant space near the upper marginal edge and in the front of the back section, the opposite ends of said back section and the backs of said end sections being secured together.

10. Multiple seating as claimed in claim 9 in which the reentrant space of said back section is covered by a molded substantially rigid sheet material.

11. Multiple seating comprising a seating structure having a pair of end sections each having a side and a back formed from a pair of molded shells coinciding with one another at the edges, spaced apart in the sides and backs and laminated together at the bottom, said bottom laminations being shaped to form a recess open at the bottom adapted to receive a frame, a frame disposed in said recess and fastened to said laminated bottom structure, and a molded back section telescopically inserted into the backs of said end sections and also secured to said frame.

12. Multiple seating as claimed in claim 11 in which said molded back section is hollow and upwardly extending braces are disposed within said hollow back section and secured to said frame and said back section.

13. Multiple seating comprising a seating structure having a pair of end sections each having a side and a back, and at least one back section formed from a front shell and a rear shell, said back section being telescopically combined with the backs of said end sections engaging said back section in a telescopic joint, said structure being mounted on a frame and means securing a lower edge of a rear shell of said back section to said frame.

14. Multiple seating comprising a seating structure having a pair of end sections each having a side, a back and a bottom formed from a pair of molded shells coinciding with one another at the edges and at the bottom, said end sections being mounted and secured to a frame, and a supporting member secured to opposite sides of said frame and extending beneath said laminated bottom from front to back.

15. Multiple seating as claimed in claim 5 in which there are a plurality of molded back sections.

References Cited in the file of this patent
UNITED STATES PATENTS

| | | |
|---|---|---|
| 2,833,339 | Liljengren | May 6, 1958 |
| 2,979,122 | Knoll | Apr. 11, 1961 |